Figure 1:
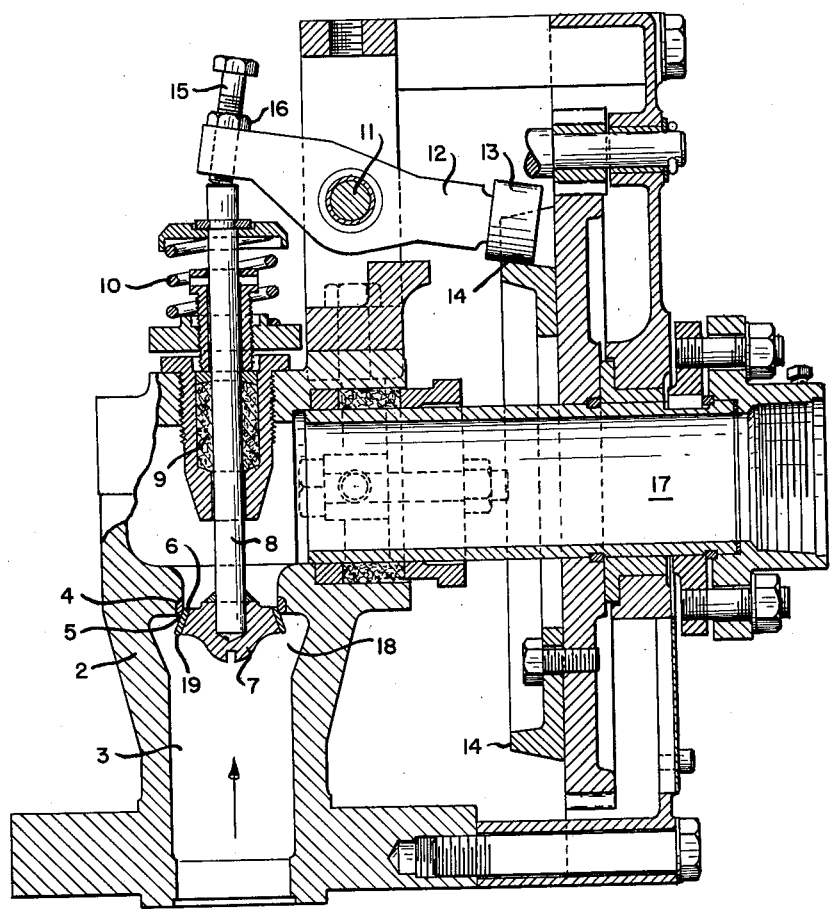

March 5, 1963 J. D. BAKER 3,080,144
ANTI-SCORING VALVE
Filed Dec. 24, 1959 2 Sheets-Sheet 1

INVENTOR
James D. Baker

March 5, 1963   J. D. BAKER   3,080,144
ANTI-SCORING VALVE

Filed Dec. 24, 1959   2 Sheets-Sheet 2

INVENTOR
James D. Baker

" # United States Patent Office 3,080,144
Patented Mar. 5, 1963

3,080,144
ANTI-SCORING VALVE
James D. Baker, Erie, Pa., assignor to Blaw-Knox Company, Pittsburgh, Pa., a corporation of Delaware
Filed Dec. 24, 1959, Ser. No. 861,833
7 Claims. (Cl. 251—121)

This invention relates to valve structure and more particularly to valve structure provided with means separate from the seating portion of the movable valve element but connected and movable therewith and operable when the valve is open to control the flow of fluid through the valve. The invention further relates to valve structure designed to minimize wear on the valve seat by fluid traversing the valve when the valve is open and having means connected and movable with the movable valve element to accomplish that function.

My valve structure has various uses such, for example, as to control steam flow to a soot blower. In the use of a soot blower it is necessary from time to time to increase or decrease the quantity of steam per unit of time passing through the blower. This has heretofore been done by using a set of orifice plates and substituting one plate for another to alter the steam flow. Such a provision was not entirely satisfactory because of the time and labor required to change orifice plates. It has also been proposed to employ a flow control member separate from the movable valve element and adjustable relatively to a portion of the fluid passage but that structure has not proved efficient in use; moreover, its provision has involved undesirable complexity of mechanism.

I provide a relatively simple yet highly effective valve structure having means separate from the seating portion of the movable valve element for controlling the flow through the valve when the valve is open with easily adjustable means whereby the flow may be increased or decreased at will. The control of the flow at a zone remote from the valve seat results in reduction of wear on the valve seat since the velocity of fluid flow across the seat is less than that at the control zone.

I provide a valve structure comprising a casing having therein a valve seat and a passage substantially coaxial with the valve seat and a valve element in the casing having a seating portion adapted to engage the valve seat to close the valve and a throttling portion disposed relatively to the seating portion so that upon movement of the seating portion of the valve element away from the seat when the valve is opened the throttling portion moves in said passage into a position in which the annular flow area between the throttling portion of the valve element and the proximate portion of said passage is less than the annular flow area between the seating portion of the valve element and the valve seat.

Preferably my valve structure comprises a casing having therein a valve seat and a passage of generally funnel shape substantially coaxial with the valve seat and a valve element in the casing having a seating portion adapted to engage the valve seat to close the valve and a throttling portion disposed relatively to the seating portion so that upon movement of the seating portion of the valve element away from the seat when the valve is opened the throttling portion moves in said passage in the direction from the larger to the smaller end thereof into a position in which the annular flow area between the throttling portion of the valve element and the proximate portion of said passage is less than the annular flow area between the seating portion of the valve element and the valve seat.

I provide means for moving the valve element in the casing, such means having an operating element having a movement of predetermined amplitude and adjustable means operatively connecting the operating element with the valve element to predeterminedly control the ultimate open position of the valve element upon a movement of the operating element of said predetermined amplitude. The operating element may be a pivoted arm having a pivotal movement of predetermined amplitude, and I preferably provide an adjusting screw connected with one of said arms and the valve element and engaging the other thereof to predeterminedly control the ultimate open position of the valve element upon a pivotal movement of the arm of said predetermined amplitude.

Desirably the valve seat is removable and replaceable in the casing. I prefer to employ a removable and replaceable element comprising the valve seat and said passage, the latter being preferably of generally funnel shape.

The passage in the casing may be disposed relatively to the valve seat in the direction in which the valve element moves relatively to the casing upon opening of the valve. Alternatively the passage may be disposed relatively to the valve seat in the direction opposite the direction in which the valve element moves relatively to the casing upon opening of the valve. In the former case the throttling portion of the valve element is preferably of greater diameter than the seating portion thereof and in the latter case the throttling portion of the valve element is preferably of smaller diameter than the seating portion thereof. Also in the latter case the portion of the valve element between the seating portion and the throttling portion is preferably concave in axial cross-section.

Other details, objects and advantages of the invention will become apparent as the following description of certain present preferred embodiments thereof proceeds.

Figure 2:
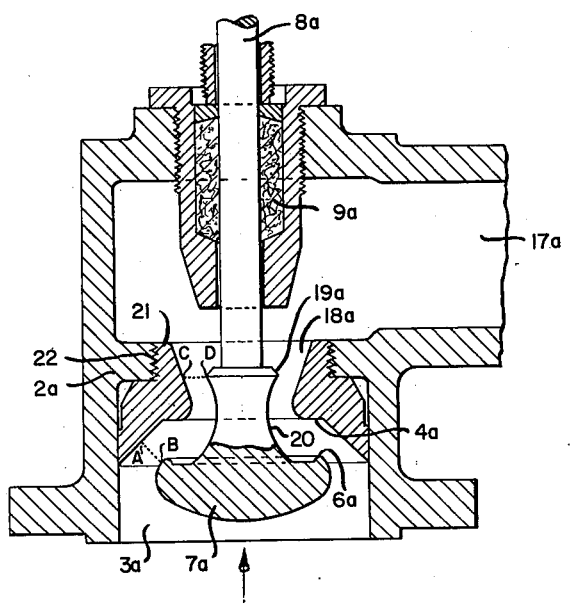
Figure 3:
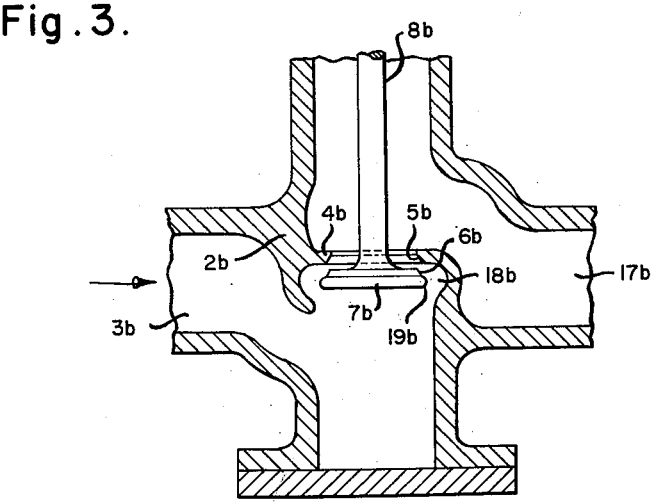

In the accompanying drawings I have shown certain present preferred embodiments of the invention in which FIGURE 1 is a fragmentary axial cross-sectional view through valve structure embodying my invention utilized in a soot blower;

FIGURE 2 is a diagrammatic fragmentary view showing a modified construction; and FIGURE 3 is another diagrammatic fragmentary view showing a further modified construction.

Referring now more particularly to the drawings, FIGURE 1 shows a valve comprising a casing 2 having a generally vertical inlet 3 through which steam or other fluid from a suitable source is adapted to flow upwardly under high pressure. The casing 2 has a valve seat 4 which is of annular shape and may be of relatively hardened steel having a generally conical face 5 against which the seating portion 6 of a valve element 7 is adapted to seat to close the valve. The valve element 7 is carried by a stem 8 passing upwardly through a packing gland 9 and normally urged upwardly by a compression coil spring 10 as shown in FIGURE 1. Thus the spring 10 normally maintains the valve element seated to close the valve.

Pivoted at 11 is an arm 12 having at its outer end a roller 13 serving as a cam follower following a rotary cam 14 forming part of the soot blower in which the valve is embodied. As the cam 14 rotates it causes the arm 12 to partake of pivotal movement about the axis of the pivot 11. A screw 15 is threaded through the outer end of the arm 12 and maintained in adjusted position by a lock nut 16. The lower end of the screw 15 engages the upper end of the valve stem 8 as shown in FIGURE 1. Fluid passing upwardly past the valve seat 4 is discharged toward the right viewing FIGURE 1 through a discharge passage 17. Other elements forming part of the soot blower but having no relation to the present invention are not described.

The casing 2 has below the valve seat 4 a passage 18 which is substantially coaxial with the valve seat 4. The valve element 7 has a throttling portion 19 which as shown in FIGURE 1 may be below the seating portion of the valve element and of substantially greater diameter. Upon movement of the valve element downwardly viewing FIGURE 1 away from the seat 4 the throttling portion 19 moves in the passage 18 into a position in which the annular flow area between the throttling portion of the valve element and the proximate portion of the passage is less than the annular flow area between the seating portion of the valve element and the valve seat. It will be seen that as the valve element 7 moves downwardly viewing FIGURE 1 the seating portion 6 thereof moves gradually farther and farther away from the seat 4 and the throttling portion 19 moves closer and closer to the lower portion of the passage 18 so that the annular flow area between the throttling portion of the valve element and the proximate portion of the passage is less than the annular flow area between the seating portion of the valve element and the valve seat. This has the advantage that the control of the flow of fluid when the valve is open is at the throttling portion of the valve element and not at the valve seat and the velocity of the fluid is greatest at the throttling portion.

The arm 12 partakes of motion of predetermined amplitude since it is controlled by a rotating cam. However, by adjustment of the screw 15 the extent to which the valve stem and valve are depressed upon a pivotal movement of the arm 12 of predetermined amplitude can be determined as desired. Thus the valve may be adjusted so that the throttling portion 19 approaches as closely as desired to the lower portion of the passage 18 to effect a desired degree of throttling or in other words a desired control of the flow of fluid through the valve.

While the passage 18 may be of various shapes I prefer to make it of generally funnel shape as shown in FIGURE 1. Making the passage of generally funnel shape not only facilitates flow control but insures a relatively smooth flow of fluid around the valve element.

While in FIGURE 1 the passage 18 is disposed relatively to the valve seat in the direction in which the valve element moves relatively to the casing upon opening of the valve it is possible to dispose such passage relatively to the valve seat in the direction opposite the direction in which the valve element moves relatively to the casing upon opening of the valve. Such a structure is shown in FIGURE 2 in which the parts generally speaking are analogous to those of FIGURE 1 but the passage 18a is disposed above rather than below the valve seat 4a. The valve element 7a has an enlarged lower portion providing the seating portion 6a adapted when the valve element is moved upwardly to seat against the valve seat 4a. The throttling portion of the valve element in FIGURE 2 is at 19a.

When the valve of FIGURE 2 is in closed position with the seating portion 6a seated on the seat 4a the throttling portion 19a is disposed above the passage 18a of generally funnel shape. When the valve element is moved downwardly, as, for example, to the position shown in FIGURE 2, the seating portion 6a moves away from the seat 4a and the throttling portion 19a moves downwardly in the passage 18a until the valve element reaches a position in which the annular flow area C-D indicated in FIGURE 2 between the throttling portion of the valve element and the proximate portion of the passage 18a is less than the annular flow area A-B between the seating portion of the valve element and the valve seat. The portion 20 of the valve element between the seating portion and the throttling portion is concave in axial cross-section as shown in FIGURE 2 promoting smooth flow of fluid through the valve.

In FIGURE 2 the casing 2a has therein a removable and replaceable element 21 which comprises the valve seat 4a and the passage 18a. The element 21 may be made of hardened steel and may be threaded into place in the casing by threads 22 shown in FIGURE 2.

FIGURE 3 shows a modified structure analogous to FIGURE 1 except that in FIGURE 3 the inlet is from the left as indicated at 3b. Otherwise the elements of FIGURE 3 are analogous to those of FIGURE 1 and bear the same reference numerals each with the letter "b" appended.

It is to be understood that the means for operating the valve element in FIGURES 2 and 3 may be the same as in FIGURE 1; FIGURES 2 and 3 are purely diagrams to show different arrangements of the valve element with the throttling portion and cooperating passage whereby when the valve is open the flow is controlled by the throttling portion and not by the seating portion of the valve cooperating with the valve seat. The control of the flow is very simply effected by adjustment of the screw 15 shown in FIGURE 1. The cooperating valve elements are shaped so that the flow of the fluid through the valve is smooth, promoting high efficiency while at the same time minimizing wear on the valve seat and consequently greatly increasing the life of the seat and the seating portion of the valve and reducing down time for valve and seat changes.

While I have shown and described certain present preferred embodiments of the invention it is to be distinctly understood that the invention is not limited thereto but may be otherwise variously embodied within the scope of the following claims.

I claim:

1. A valve structure comprising a casing having therein a valve seat and a passage substantially coaxial with the valve seat and a valve element in the casing having a seating portion adapted to engage the valve seat to close the valve and a throttling portion disposed relatively to the seating portion so that upon movement of the seating portion of the valve element away from the seat when the valve is opened the throttling portion moves in said passage into a position in which the annular flow area between the throttling portion of the valve element and the proximate portion of said passage is less than the annular flow area between the seating portion of the valve element and the valve seat, said passage being disposed relatively to the valve seat in the direction in which the valve element moves relatively to the casing upon opening of the valve.

2. A valve structure comprising a casing having therein a valve seat and a passage of generally funnel shape substantially coaxial with the valve seat, a valve element in the casing having a seating portion adapted to engage the valve seat to close the valve and a throttling portion disposed relatively to the seating portion so that upon movement of the seating portion of the valve element away from the seat when the valve is opened the throttling portion moves in said passage in the direction from the larger to the smaller end thereof into a position in which the annular flow area between the throttling portion of the valve element and the proximate portion of said passage is less than the annular flow area between the seating portion of the valve element and the valve seat and means separate from said passage limiting movement of the valve element in the direction in which the seating portion of the valve element moves away from the seat upon opening of the valve.

3. A valve structure comprising a casing having therein a valve seat and a passage substantially coaxial with the valve seat and a valve element in the casing having a seating portion adapted to engage the valve seat to close the valve and a throttling portion disposed relatively to the seating portion so that upon movement of the seating portion of the valve element away from the seat when the valve is opened the throttling portion moves in said passage into a position in which the annular flow area between the throttling portion of the valve element and the proximate portion of said passage is less than the annular flow area between the seating portion of the valve element and the valve seat, the valve seat and passage being formed as a unitary element removably mounted in the casing.

4. A valve structure comprising a casing having therein a valve seat and a passage of generally funnel shape substantially coaxial with the valve seat and a valve element in the casing having a seating portion adapted to engage the valve seat to close the valve and a throttling portion disposed relatively to the seating portion so that upon movement of the seating portion of the valve element away from the seat when the valve is opened the throttling portion moves in said passage in the direction from the larger to the smaller end thereof into a position in which the annular flow area between the throttling portion of the valve element and the proximate portion of said passage is less than the annular flow area between the seating portion of the valve element and the valve seat, the valve seat and said passage of generally funnel shape being formed as a unitary element removably mounted in the casing.

5. A valve structure comprising a casing having therein a valve seat and a passage of generally funnel shape substantially coaxial with the valve seat and a valve element in the casing having a seating portion adapted to engage the valve seat to close the valve and a throttling portion disposed relatively to the seating portion so that upon movement of the seating portion of the valve element away from the seat when the valve is opened the throttling portion moves in said passage in the direction from the larger to the smaller end thereof into a position in which the annular flow area between the throttling portion of the valve element and the proximate portion of said passage is less than the annular flow area between the seating portion of the valve element and the valve seat, said passage of generally funnel shape being disposed relatively to the valve seat in the direction in which the valve element moves relatively to the casing upon opening of the valve and the throttling portion of the valve element is of greater diameter than the seating portion thereof.

6. A valve structure comprising a casing having therein a valve seat and a passage of generally funnel shape substantially coaxial with the valve seat, a valve element in the casing having a seating portion adapted to engage the valve seat to close the valve and a throttling portion disposed relatively to the seating portion so that upon movement of the seating portion of the valve element away from the seat when the valve is opened the throttling portion moves in said passage in the direction from the larger to the smaller end thereof into a position in which the annular flow area between the throttling portion of the valve element and the proximate portion of said passage is less than the annular flow area between the seating portion of the valve element and the valve seat and means separate from said passage limiting movement of the valve element in the direction in which the seating portion of the valve element moves away from the seat upon opening of the valve, said passage of generally funnel shape being disposed relatively to the valve seat in the direction opposite the direction in which the valve element moves relatively to the casing upon opening of the valve and the throttling portion of the valve element being of smaller diameter than the seating portion thereof.

7. A valve structure comprising a casing having therein a valve seat and a passage of generally funnel shape substantially coaxial with the valve seat, a valve element in the casing having a seating portion adapted to engage the valve seat to close the valve and a throttling portion disposed relatively to the seating portion so that upon movement of the seating portion of the valve element away from the seat when the valve is opened the throttling portion moves in said passage in the direction from the larger to the smaller end thereof into a position in which the annular flow area between the throttling portion of the valve element and the proximate portion of said passage is less than the annular flow area between the seating portion of the valve element and the valve seat and means separate from said passage limiting movement of the valve element in the direction in which the seating portion of the valve element moves away from the seat upon opening of the valve, said passage of generally funnel shape being disposed relatively to the valve seat in the direction opposite the direction in which the valve element moves relatively to the casing upon opening of the valve, the throttling portion of the valve element being of smaller diameter than the seating portion thereof and the portion of the valve element between the seating portion and the throttling portion being concave in axial cross-section.

References Cited in the file of this patent

UNITED STATES PATENTS

| | | |
|---|---|---|
| 217,745 | Pringle | July 22, 1879 |
| 1,000,455 | Studds | Aug. 15, 1911 |
| 1,903,816 | Hanson | Apr. 18, 1933 |
| 2,605,107 | Glinn | July 29, 1952 |
| 2,685,294 | Gold | Aug. 3, 1954 |
| 2,746,471 | Cobb | May 22, 1956 |

FOREIGN PATENTS

| | | |
|---|---|---|
| 43,582 | Germany | July 5, 1888 |